Figure 1:
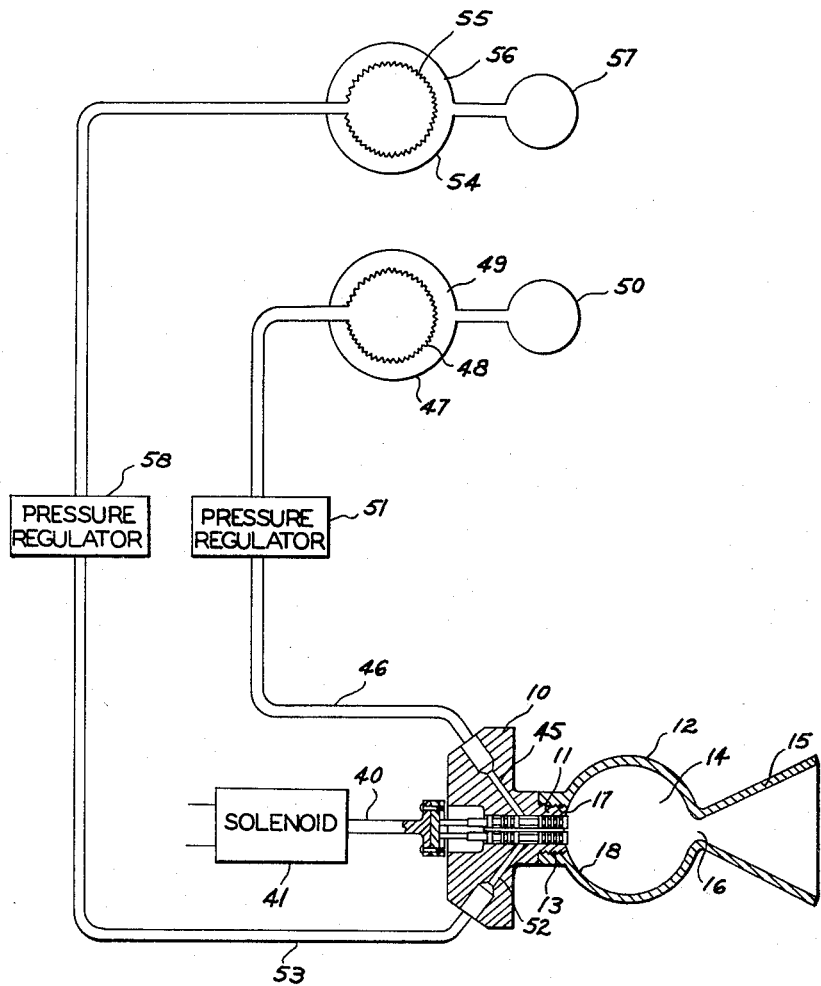

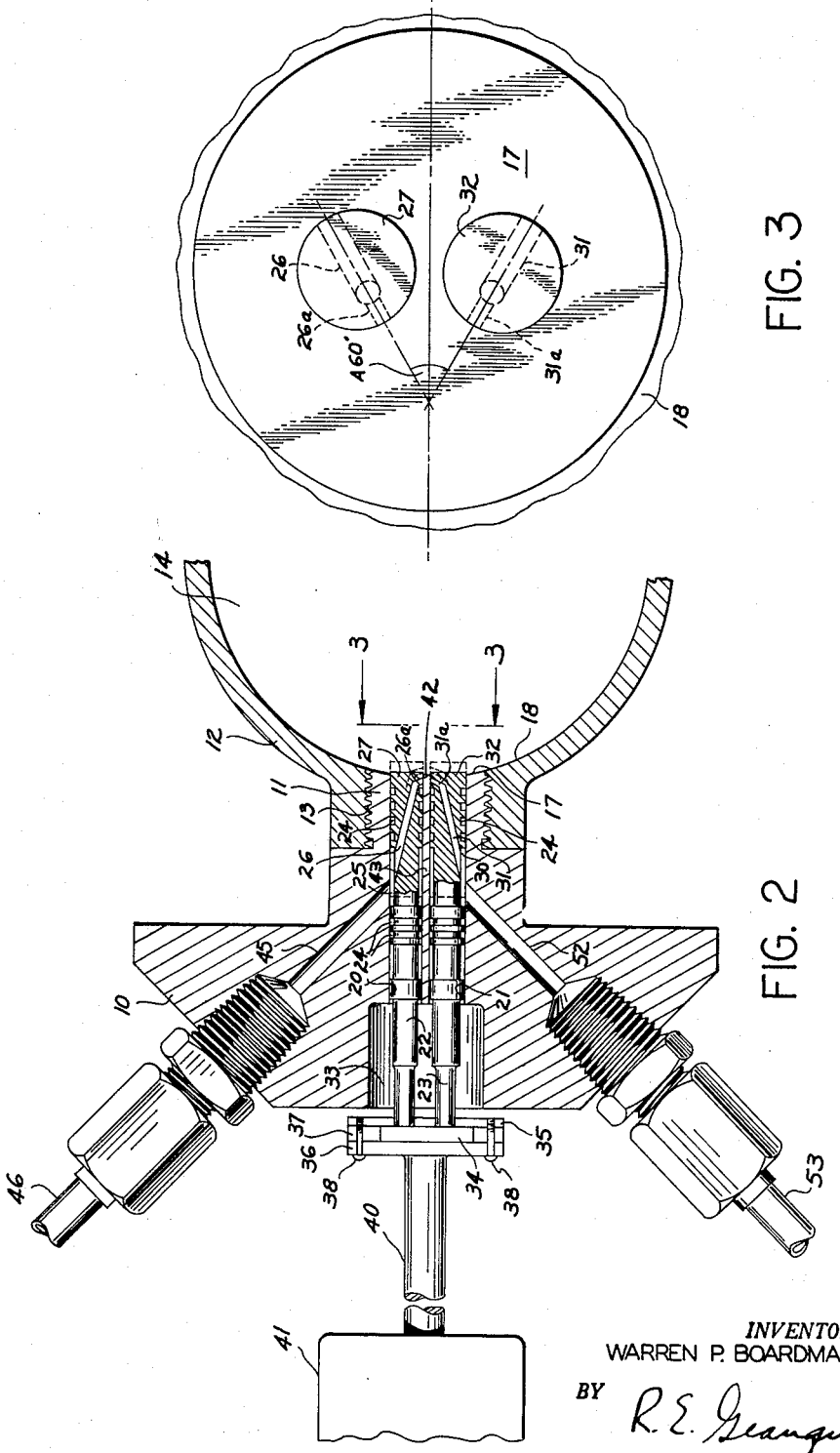

April 20, 1965     W. P. BOARDMAN, JR     3,178,884
PULSE ROCKET
Filed Nov. 14, 1960     4 Sheets-Sheet 4
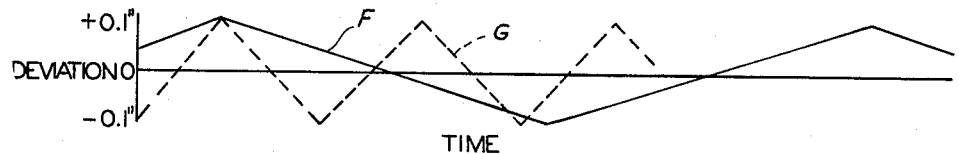
FIG. 8
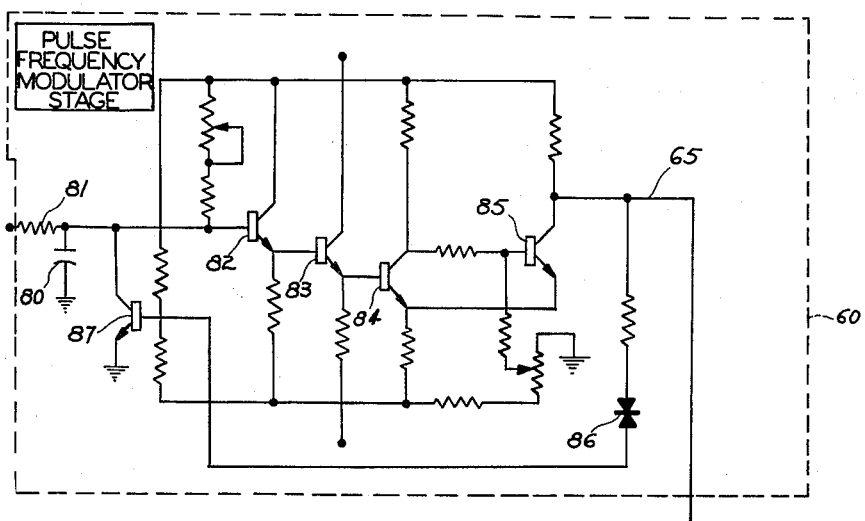
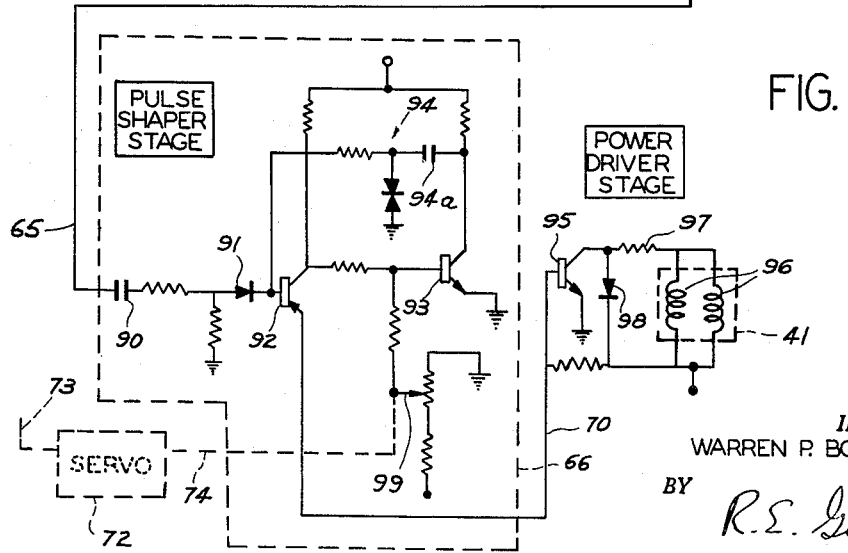
FIG. 9
*INVENTOR.*
WARREN P. BOARDMAN, JR.
BY
R.E. Geangue
ATTORNEY United States Patent Office 3,178,884
Patented Apr. 20, 1965

3,178,884
PULSE ROCKET
Warren P. Boardman, Jr., Granada Hills, Calif., assignor to The Marquardt Corporation, Van Nuys, Calif., a corporation of California
Filed Nov. 14, 1960, Ser. No. 69,039
10 Claims. (Cl. 60—35.6)

This invention relates to a pulse rocket and more particularly to a pulse rocket having fast response time and precise control of thrust level.

Pulse rockets presently in use have a minimum thrust build up and decay time which results in low proportional control ratios. In other words, this ratio between maximum and minimum throttled thrust of present rockets is low because the minimum build up and decay time is excessively long. In the present invention, the minimum pulse duration time is short enough to permit a proportional control ratio many times greater than that of prior devices. Thus, the pulse rocket of the present invention is particularly suitable for position, attitude and trajectory control of objects in flight. Since the pulse width and/or pulse rate can be varied, tighter control loops for directional control and more precise modulation of thrust is possible with the present invention. In addition, the rocket can be lighter in weight and smaller in size and have lower fuel consumption and higher combustion efficiency.

Basically, the present invention consists of a combustion chamber and nozzle and a pair of high speed propellant injectors for injecting pressurized liquid fuel and oxidizer into the chamber to react hypergolically. The injectors are opened and closed rapidly in a pulsing mode by an actuator which can control the pulse repetition rate (pulse frequency) and the pulse time duration (pulse width), either independently or in combination. The injectors are moved together by the actuator, and each injector contains a passage which is in full communication with the rocket chamber at one end of the stroke and is fully shut off over another part of the stroke. While various fuels and oxidizers can be utilized, hydrazine fuel and nitrogen tetroxide oxidizer are entirely suitable.

It is therefore an object of the present invention to provide a pulse rocket having a minimum pulse duration time and a high proportional control ratio.

Another object of the invention is to provide a pulse rocket in which the pulse rate and/or the pulse width are variable to obtain a tight control loop and precise modulation of thrust.

A further object of the invention is to provide a pulse rocket having fuel and oxidizer injectors which are moved by an actuator in various modes to provide variable pulse rate and pulse width.

Another object of the invention is to provide a combustion chamber for power developing units, into which fuel and oxidizer are intermittently injected to produce power pulses.

Figure 4:
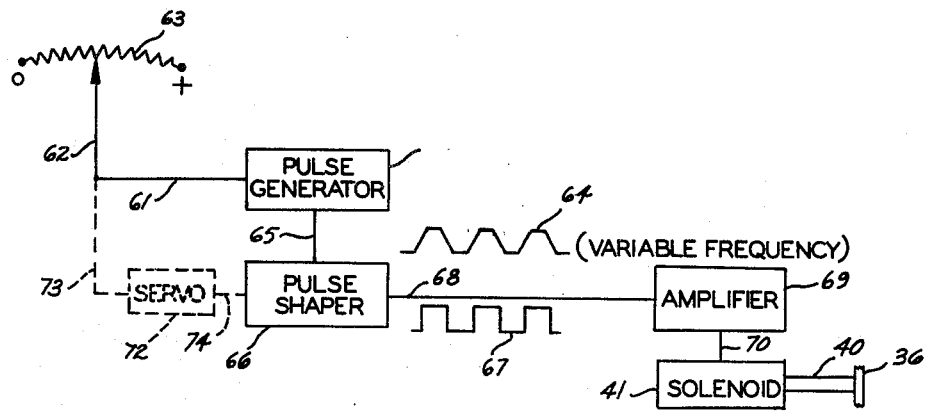
Figure 5:
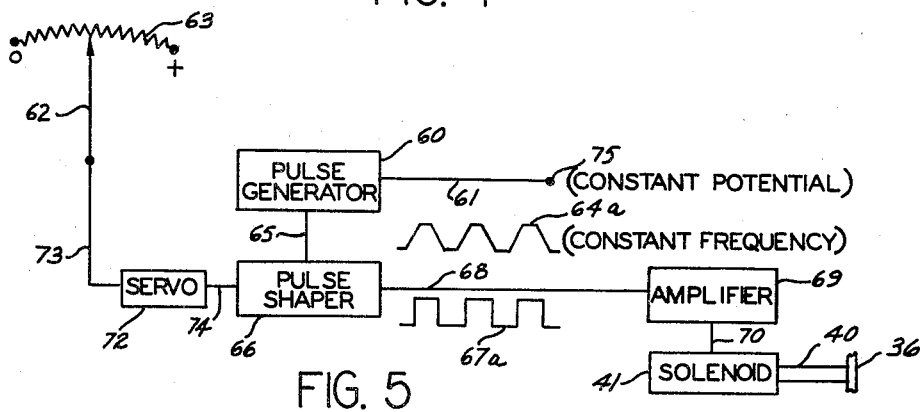
Figure 6:
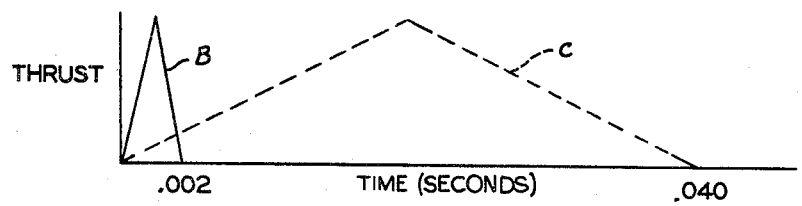
Figure 7:
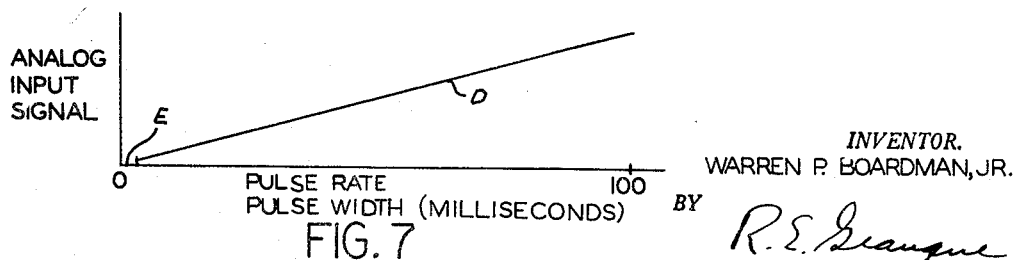

These and other objects of the invention not specifically set forth above will become readily apparent from the accompanying description and drawings in which:

FIGURE 1 is a sectional view of the pulse rocket of the present invention showing the injectors connected to the fuel and oxidizer tanks, FIGURE 2 is an enlarged view of the injectors showing the two limit positions thereof, FIGURE 3 is a plan view along line 3—3 of FIGURE 2 illustrating the passages in the injectors, FIGURE 4 is a schematic circuit for the actuator solenoid utilized to move the injectors, FIGURE 5 is a modified schematic circuit for the solenoid actuator providing for variation in pulse width, FIGURE 6 is a plot comparing minimum thrust build-up and decay time of the present invention with that of prior devices, FIGURE 7 is a plot of input signal versus pulse frequency or pulse width supplied to the actuator solenoid, FIGURE 8 is a plot comparing the "limit cycle" mode of control with that of prior devices, and FIGURE 9 is a detailed circuit diagram of the schematic circuitry of FIGURE 4.

The embodiment of the invention chosen for illustration in FIGURE 1 comprises an injector block 10 which has a threaded projection 11. A circular combustion chamber 12 has a threaded opening 13 receiving the projection 11 and interior space 14 of the combustion chamber communicates with the interior of a nozzle 15 through the nozzle throat 16. As illustrated in FIGURE 2, the end surface 17 of the projection 11 forms a continuation of the interior surface 18 of the combustion chamber 12.

The injection block 10 contains two cylindrical openings 20 and 21 which receive injection plungers 22 and 23, respectively. Each injector or plunger contains a plurality of reduced sections 24 to minimize sliding friction with its circular opening and to reduce the weight of the plunger. In addition, plunger 22 contains an enlarged manifold groove 25 in communication at its lower end, with a plunger passage 26 extending towards the end 27 of the plunger. The orifice end 26a of the passage 26 is reduced in cross section and is at a greater angle to the axis of the plunger than passage 26. In a similar manner, the plunger 23 contains a groove manifold 30 in communication at its lower end, with a plunger passage 31 extending towards the end 32 of the plunger. The orifice end 31a has a reduced cross section and is at a greater angle to the axis of plunger 21 than passage 31.

The injector block 10 contains a cutout 33 through which the plungers extend and the ends of the plungers are connected to a common block 34. A plate 35 having openings for the plunger ends is located on the underside of a block 34 and a plate 36 is located on the upper side of block 34, and the block is secured between the plates 35 and 36 by a plurality of screws 38 passing through the plates and the rings 37. A rod 40 connects plate 36 with the armature of a solenoid actuator 41 so that movement of the armature will move the plate 35 into engagement with injector block 10, thereby moving the plungers 22 and 23 into the dotted line position of FIGURE 2. In the dotted line position, the orifice ends 26a and 31a completely clear surface 42 on the section 43 of block 10 which separates the plunger openings 20 and 21. As illustrated in FIGURE 3, the passages 26 and 31 are located in planes which intersect at angle A of approximately 60 degrees so that substances ejected from orifice ends 26a and 31a which clear of block section 43 will mix at a point (within the combustion chamber) displaced from the ends of the plungers.

The injector block 10 contains an oxidizer passage 45 which connects with an external passage 46 connecting with the oxidizer tank 47. The oxidizer, such as nitrogen tetroxide ($N_2O_4$), is contained in the tank within a Teflon bladder 48 and the oxidizer is continually pressurized by high pressure nitrogen introduced to space 49 around the bladder from a supply tank 50. The passage 46 contains a pressure regulator 51 to maintain the optimum pressure of the oxidizer directed to the nozzle end 26a. In a similar manner, the injector block 10 contains a fuel passage 52 which connects with an external passage 53 leading to a fuel tank 54. The fuel, such as hydrazine ($N_2H_4$), is contained in the tank within a Teflon bladder 55 and the fuel is pressurized by nitrogen gas in space 56 received from tank 57. The passage 53 also contains a pressure regulator 58 to maintain optimum fuel pressure at the nozzle passage 31a.

When the injector plungers 22 and 23 are moved to the dotted line position of FIGURE 2, the oxidizer and fuel will be ejected from the nozzles 26a and 31a and mixed together so that they react hypergolically within the combustion chamber to produce a fast buildup of pressure within the combustion chamber. The ejection of fuel and oxidizer commences as the nozzle ends 26a and 31a clear the surface 42, and maximum flow is obtained at the end of the solenoid stroke when the plungers are in the dotted line position of FIGURE 2 and the full area of the nozzles are clear of the block section 43. In the full line position of the plungers, the orifices 26a and 31a are fully cut off by the block section 43. Since hypergolic combustion is very nearly instantaneous, the chamber pressure can reach its full value in about a millisecond and pressure decay is equally fast when injection is cut off. The rapid movement of the plunger rod 40 by the solenoid between the full line and dotted line positions of FIGURE 2, can produce a very short pulse time duration with complete control of pulse amplitude and repetition rate.

The pulse controller circuit is shown schematically in FIGURE 4 and consists of a pulse generator 60 having an input terminal line 61 connected with a wiper 62 movable along a winding 63. The wiper 62 and winding 63 can consist of the output elements of an autopilot or attitude control computer for a movable object and the pulse generator 60 produces an electrical pulse rate proportional to the input voltage signal at wiper 62. The output of the pulse generator illustrated by pulse pattern 64, is connected by line 65 to a pulse shaper 66 and the leading portions of pulses 64 control the frequency of the shaped output pulse pattern 67 in output line 68 produced by shaper 66. The shaped pulses 67 are amplified by amplifier 69 and then fed through line 70 to the actuator solenoid 41. Each pulse causes the solenoid 41 to move the plungers 22 and 23 into and out of the combustion chamber, between the full and dotted line positions of FIGURE 2, to produce a thrust pulse since the armature is biased to assume the full line position when no pulse is being received. The shaper 66 produces a constant pulse width although the pulse frequency varies with the input signal from wiper 62. If desired, an element of the pulse shaper can be controlled by a servo 72 connected to the input signal by line 73 and the pulse shaper by line 74 (see FIGURE 4). In such case, the pulse width as well as pulse frequency can be increased in proportion to the magnitude of the input signal.

In the alternative, the circuit of FIGURE 5 can be utilized wherein the pulse shaper 66 is connected to a constant potential source 75 by line 61 to provide a constant pulse frequency to the pulse shaper 66. The servo 72 is connected to the wiper 62 in order to vary the pulse width of the output 67a in line 68 in direct proportion to the input signal from the wiper. Thus, either the pulse frequency or pulse width or both in combination can vary in direct proportion to the input signal. The extremely short pulse duration time (pulse width) and fast repetition rate (pulse frequency) permits a very high proportional control ratio, because short thrust buildup and decay times can be accomplished.

Referring to FIGURE 6, curve B shows that a minimum thrust pulse is obtainable with the present invention in two milliseconds, while curve C shows a minimum thrust pulse from prior devices obtainable in forty milliseconds. This minimum thrust pulse of the present invention results directly from the fact that injector plungers are light so that they can be moved rapidly into and out of the combustion chamber, and also from the fact that the fuel and oxidizer combine hypergolically almost instantaneously. Thus, the proportional control ratio obtainable by the present invention is many times greater than obtainable by prior devices of this type.

Referring to FIGURE 7, the variation in pulse rate and pulse width as a function of the magnitude of the input signal is illustrated by curve D and the dead band of response is the intial portion E of the curve. Since either the pulse rate or the pulse width or both increase in magnitude with increase in the error signal, it is apparent that stable control of the movable object is obtainable. In other words, as the input signal approaches zero the pulse repetition rate (frequency) and/or the pulse time duration (width) approach zero so that the output of the pulse rocket approaches zero as the null position of the control system is approached. When a large error signal exists, the pulse repetition rate and/or pulse time duration will be large in order to reduce the error at a fast rate. Since the magnitude of error can determine the pulse frequency and/or pulse width, excellent control of the damping and overshoot is possible in all types of servo systems. Further, the dead band E can be very small to reduce hunting and provide better stability. In other words, with a small dead band, the minimum impulse bit provided by the rocket can be very low so that over correction does not result.

Another advantage of the present invention resulting from the short, high-speed pulses resides in the operation during the "limit cycle" mode wherein the dynamic system is continually held between two limits by applying a minimum correcting force whenever the system reaches one of the limits. Referring to FIGURE 8, the limits of normal operation are chosen to be between +0.1 second of angular deviation and −0.1 second of angular deviation. In prior devices, the minimum thrust pulse operative upon reaching either of these limits causes correction along the dashed curve G. For instance, when the positive limit is reached, the pulses produce a force to reverse the motion of the system so that it proceeds in the direction of the other limit. Upon reaching the opposite limit, the same action occurs and a periodic motion is established. With the present invention, the minimum correction force available at either limit can be so small that the motion of the system will follow curve F. It is therefore apparent that a minimum correction force is available with the present invention which is just sufficient to reverse the motion of the system and therefore, fewer impulses and less power is required for the operation along curve F by virtue of the short pulse duration.

It can be shown that the period of the limit cycle is inversely proportional to the square of the minimum pulse duration time. The quantity of propellant consumed in the minimum cycle operation is as follows:

$$Q_p = \frac{(F \times \Delta t)^2}{I_{sp}}$$

where F is the thrust level or amplitude of the pulse, $\Delta t$ is the pulse duration time, and $I_{sp}$ is the specific impulse (pounds of thrust per pound of fuel per second). Obviously, the fuel consumption can be drastically reduced by virute of the short pulse duration ($\Delta t$) available with the present invention.

The circuit diagram for the pulse generator 60 and the pulse shaper 66 of FIGURE 4 is shown in FIGURE 9. The operation of the pulse generator is as follows. The input voltage from the wiper 62 charges the capacitor 80 through the resistor 81. This charge is fed to the transistor 82 connected as an emitter follower and the output of this transistor is fed into another emitter follower 83. The reason for cascading two emitter followers is to increase the input impedance. The output of the second emitter follower 83 is fed into a Schmitt trigger comprising transistors 84 and 85. This circuit can be adjusted to trigger at a minimum voltage input of approximately 0.2 to 0.4 volt. Normally, transistor 84 is non-conducting and transistor 85 is conducting which makes the output voltage close to zero. When the minimum signal voltage is present, the circuit "triggers" and transistor 84 will then conduct and transistor 85 becomes non-conductive. The output voltage rises to the supply voltage and the zener diode 86 blocks current from flowing into the base of the "dump" transistor 87 until a certain voltage level is reached (approximately 6.0 volts). This insures that transistor 85 is rendered non-conducting (triggered) before the capacitor is discharged. The dump transistor discharges the capacitor when it is switched "on" by the current flow into its base connection. The input to transistor 82 then falls exponentially (time constant=RC where R is the saturation resistance of transistor 87). When this reaches a minimum value (reset voltage), and is transmitted to the base of transistor 84, the Schmitt trigger goes back to its original state with transistor 84 non-conducting and transistor 85 conducting. The output voltage in line 65 goes back to zero and the current going into the base of transistor 87 ceases. Thus, this transistor again becomes a high impedance to ground and the capacitor charges to repeat the cycle. The pulse repetition rate is determined by how fast the capacitor charges to the "trigger" level of the Schmitt trigger. The charging time is proportional to the input voltage, thus the input is modulated such that the output pulse repetition rate is proportional to the input D.C. voltage level.

Referring to the circuit for the pulse shaper 66, this circuit can have a prescribed pulse width (such as 2.5 milliseconds) for all pulse repetition rates. The pulses from the pulse generators 60 introduced through output line 65, vary with input voltage and hence, the pulse shaper is required. The pulse shaper is a monostable flip-flop. The input from the pulse generator 60 is coupled by a capacitor 90, and a diode 91 is used in the base of the first transistor 92 to prevent a large negative voltage from appearing across the base to emitter junction. Normally, transistor 92 is non-conducting and transistor 93 is conducting. A positive pulse applied to the base of transistor 92 starts it to conduct and this lowers the voltage on the collector. This lower voltage causes transistor 93 to be cut off and its collector voltage rises to B+. This higher voltage causes a pulse of current to pass through the R-C circuit 94 from the collector of transistor 93 to the base of transistor 92, holding transistor 92 conducting and transistor 93 non-conducting. The capacitor 94a of circuit 94 discharges through transistor 93 and is ready for the next pulse, and the output is taken from the emitter of transistor 92 and is fed to the solenoid driver stage through the line 70.

The solenoid driver is a power transistor 95 with the coils 96 of the solenoid or torque motor in parallel in the collector circuit. A forcing resistor 97 is placed in series with the coils to improve the time response and the diode 98 is used to clamp the collector to 100 volts. This prevents an "inductive kick" generated by the torque motor coils from breaking down the transistor. To conserve electrical power, the torque motor is spring returned when no current is flowing in the coils. Normally, transistor 92 in the pulse shaper 66 is non-conducting and hence, no current flows through the base of transistor 95. This transistor is cut off and no current flows in the torque motor coils and the rocket motor is off. As earlier described, a pulse into transistor 92 turns this transistor on and this injects current into the base of transistor 95 which makes it conduct. Current is then passed through the solenoid coils and causes the rocket motor to operate. The arm 99 of the pulse shaper circuit is the element controlled by the servo 72 to vary the pulse width of the output of the pulse shaper.

The present invention provides a pulse rocket in which minimum pulse frequency and pulse width are available to provide a high proportional control ratio and minimum fuel consumption during limit cycle operation. Also, the pulse frequency and/or pulse width can vary with the magnitude of the input signal of a control system in order to provide a stable system with minimum hunting and overshooting. Various input signals can be utilized in the circuits of FIGURES 4 and 5 and any suitable circuitry can be utilized to provide frequency and/or pulse width variation in accordance with the magnitude of the input signal. Also, any suitable servo motor 72 and solenoid 41 can be utilized. It is also contemplated that the pulse rate and/or pulse width could be varied in accordance with a mechanical force rather than with an electrical input signal. While the invention has been described in connection with a combustion chamber and nozzle, it is understood that the products of combustion in the chamber can be introduced to other suitable power producing means, instead of to the nozzle. Various other modifications are contemplated by those skilled in the art without departing from the spirit and scope of the invention as hereinafter defined in the appended claims.

What is claimed is:

1. A pulse rocket comprising an injector block, a combustion chamber secured to said block and exhausting through a nozzle, a pair of openings in said block in communication with the interior of said combustion chamber, an injector plunger slidable in each of said openings with the sliding surface of said plunger in sealing engagement with the surface of said opening, each plunger comprising an elongated body and having an elongated surface groove to provide a manifold, a passage in each of said plungers for connecting said manifold with the exterior of said plunger through an orifice end of the passage, means for reciprocating both said plungers together to move said orifice ends of said passages into and out of said combustion chamber, said orifice ends being closed by said block when out of said combustion chamber, a fuel conduit in said block continually in communication with the manifold for one of said plungers, and an oxidizer conduit in said block continually in communication with the manifold for the other of said plungers, the orifice ends of said passages directing fuel and oxidizer together for combustion while the ends are within said combustion chamber.

2. A pulse rocket as defined in claim 1 wherein said reciprocating means comprises solenoid means secured to said plungers, control means for energizing said solenoid means and responsive to an input signal, said control means comprising means for producing a pulse output having a frequency proportional to the magnitude of said input signal, and means for connecting said output with said solenoid means for causing each pulse to move said passage ends into said combustion chamber to produce a thrust pulse.

3. A pulse rocket as defined in claim 2 having means for varying the pulse duration time of said pulse output in direct proportion to the magnitude of said input signal in order to vary both the frequency and duration of said thrust pulses in accordance with said input signal.

4. A pulse rocket as defined in claim 1 wherein said reciprocating means comprises solenoid means connected to said plungers, control means for energizing said solenoid means and responsive to an input signal, said control means comprising means for producing a pulse output having a pulse duration time proportional to the magnitude of said input signal, and means for connecting said output with said solenoid means for causing each pulse to move said plunger ends into said combustion chamber to produce a thrust pulse of duration varying with pulse width.

5. In a pulse rocket producing a plurality of intermittent thrust pulses, a combustion chamber for producing a propulsion medium, a thrust producing nozzle connected with said combustion chamber and discharging said medium, valve means movable into open position for injection of reacting substance into said combustion chamber for producing said medium, electrical means for moving said valve means in a pulse mode to produce intermittent thrust pulses from intermittent injections of reacting substance into said combustion chamber, means for producing an input signal to control the thrust output of said rocket, control means for energizing said moving means and responsive to said input signal, said control means comprising means for producing a pulse output having a frequency proportional to the magnitude of said input signal, and means for connecting said pulse output with said moving means for causing each pulse to move said valve means into open position and inject reacting substance into said combustion chamber to produce thrust pulses at the frequency of said pulse output.

6. In a pulse rocket as defined in claim 5, means for varying the pulse duration time of said pulse output in direction proportion to the magnitude of said input signal in order to control the open time of said valve means and vary both the frequency and duration of said thrust pulses in accordance with said input signal.

7. In a pulse rocket producing a plurality of intermittent thrust pulses, a combustion chamber for producing a propulsion medium, a thrust producing nozzle connected with said combustion chamber and discharging said medium, valve means movable into open position for injection of reacting substance into said combustion chamber for producing said meduim, electrical means for moving said valve means in a pulse mode to produce intermittent thrust pulses from intermittent injection of reacting substance into said combustion chamber, means for producing an input signal to control the thrust output of said rocket, said control means comprising means for producing a pulse output having a pulse duration time proportional to the magnitude of said input signal, and means for connecting said pulse output with said moving means for causing each pulse to open said valve means for the pulse duration and produce thrust pulses of duration varying with pulse width of said pulse output.

8. A pulse rocket for producing a plurality of intermittent pulses on an object comprising, a combustion chamber for producing a propulsion medium, a thrust producing nozzle connected with said combustion chamber and discharging said medium, first movable valve means for intermittently injecting a first substance into said combustion chamber, second movable valve means for intermittently injecting a second substance into said combustion chamber for combination with said first substance to produce said medium, means for moving both said valve means in a pulsing mode to produce intermittent pulses from combination of said substances, means for producing an input signal to control the thrust output of said rocket, and actuating means responsive to said input signal for operating said moving means to produce a rocket thrust on said object increasing with an increase in magnitude of said input signal, said actuating means comprising means for varying the frequency of the pulsing mode of said moving means to vary the frequency of asid pulses in proportion to the magnitude of said signal.

9. A pulse rocket for producing a plurality of intermittent pulses on an object comprising, a combustion chamber for producing a propulsion medium, a thrust producing nozzle connected with said combustion chamber and discharging said medium, first movable valve means for intermittently injecting a first substance into said combustion chamber, second movable valve means for intermittently injecting a second substance into said combustion chamber for combination with said first substance to produce said medium, means for moving both said valve means in a pulsing mode to produce intermittent pulses from combination of said substances, means for producing an input signal to control the thrust output of said rocket, and actuating means responsive to said input signal for operating said moving means to produce a rocket thrust on said object increasing with an increase in magnitude of said input signal, said actuating means comprises means for varying the pulse width of the pulsing mode of said moving means to vary the pulse width of said pulse in proportion to the magnitude of said signal.

10. A pulse rocket for producing a plurality of intermittent pulses on an object comprising, a combustion chamber for producing a propulsion medium, a thrust producing nozzle connected with said combustion chamber and discharging said medium, first movable valve means for intermittently injecting a first substance into said combusiton chamber, second movable valve means for intermittently injecting a second substance into said combustion chamber for combination with said first substance to produce said medium, means for moving both said valve means in a pulsing mode to produce intermittent pulses from combination of said substances, means for producing an input signal to control the thrust output of said rocket, and actuating means responsive to said input signal for operating said moving means to produce a rocket thrust on said object increasing with an increase in magnitude of said input signal, said actuating means comprising means for varying the pulse frequency and pulse width of the pulsing mode of said moving means to vary both the pulse frequency and pulse width of said pulses in proportion to the magnitude of said signal.

References Cited by the Examiner

UNITED STATES PATENTS

| | | | |
|---|---|---|---|
| 1,856,089 | 5/32 | Brown | 239—413 X |
| 1,913,593 | 6/33 | Hofmann | 60—39.76 |
| 2,041,081 | 5/36 | Menzies | 102—49 |
| 2,465,525 | 3/49 | Goddard | 60—35.6 |
| 2,523,012 | 9/50 | Goddard | 60—35.6 X |
| 2,563,022 | 8/51 | Goddard | 60—39.76 X |
| 2,584,127 | 2/52 | Harcum et al. | 102—49 |
| 2,647,364 | 8/53 | Dreibelbis | 60—35.6 |
| 2,572,157 | 3/54 | Branson | 137—607 |
| 2,732,859 | 1/56 | Chace | 137—607 |
| 2,974,594 | 3/61 | Boehm | 102—50 |
| 3,048,719 | 8/62 | Grigsby. | |
| 3,088,406 | 5/63 | Horner | 60—35.6 X |

OTHER REFERENCES

Rocket Encyclopedia Illustrated, Aero Publishers Inc., 1959, page 44.

SAMUEL LEVINE, *Primary Examiner.*

SAMUEL FEINBERG, ABRAM BLUM, *Examiners.*